United States Patent [19]

Abel et al.

[11] Patent Number: 4,767,568

[45] Date of Patent: Aug. 30, 1988

[54] FOAM INHIBITORS FOR AQUEOUS SYSTEMS AND USE THEREOF

[75] Inventors: Heinz Abel, Reinach; Rosemarie Töpfl, Dornach, both of Switzerland

[73] Assignee: Ciba-Geigy Corporation, Ardsley, N.Y.

[21] Appl. No.: 876,133

[22] Filed: Jun. 19, 1986

[30] Foreign Application Priority Data

Jun. 27, 1985 [CH] Switzerland ............... 02719/85

[51] Int. Cl.$^4$ ................................. B01D 19/04
[52] U.S. Cl. ................................. 252/321; 252/358
[58] Field of Search ........................ 252/358, 321

[56] References Cited

U.S. PATENT DOCUMENTS

| | | | |
|---|---|---|---|
| 3,231,508 | 1/1966 | Lew | 252/152 |
| 3,673,105 | 6/1972 | Curtis et al. | 252/321 |
| 3,730,907 | 5/1973 | Shane et al. | 252/321 X |
| 3,923,683 | 12/1975 | Michalski et al. | 252/321 |
| 3,990,905 | 11/1976 | Wachala et al. | 127/44 |
| 4,071,468 | 1/1978 | Abel et al. | 252/321 |
| 4,088,601 | 5/1978 | Shane et al. | 252/321 X |
| 4,092,266 | 5/1978 | Abel | 252/321 |
| 4,107,073 | 8/1978 | Maciazek | 252/321 |
| 4,172,044 | 10/1979 | Zeidler et al. | 252/321 X |
| 4,303,549 | 12/1981 | Boylan | 252/321 |
| 4,427,454 | 1/1984 | Oyama et al. | 252/321 X |

*Primary Examiner*—John F. Terapane
*Assistant Examiner*—Catherine S. Kilby
*Attorney, Agent, or Firm*—Edward McC. Roberts

[57] ABSTRACT

The invention relates to foam inhibitors comprising
(1) (A) a reaction product of a polyol, an anhydride of an aliphatic $C_2$–$C_{10}$dicarboxylic acid and an adduct of a polyalkylene glycol and a fatty acid, or (B) a reaction product of a polyol, an anhydride of an aliphatic $C_2$–$C_{10}$dicarboxylic acid, a higher aliphatic alcohol and a polyethylene glycol,
(2) a dialkyl ester of an unsaturated dicarboxylic acid,
(3) a mineral oil,
(4) a nonionic emulsifier,
(5) an anionic emulsifier, and
(6) an alkylene diamide, to liquid formulations of such foam inhibitors, and to a process for defoaming aqueous systems with the aid thereof.

20 Claims, No Drawings

FOAM INHIBITORS FOR AQUEOUS SYSTEMS AND USE THEREOF

The present invention relates to foam inhibitors for aqueous systems, to dilute foam inhibitor compositions, and to a process for defoaming aqueous systems.

The treatment of aqueous systems with antifoams, e.g. silicone oils, for the substantial prevention of foam formation or for the removal of existing foam is already known (q.v. for example U.S. Pat. specification No. 4,071,468). Such antifoams based on silicone oil emulsions are susceptible to the high shearing forces that occur in the dyeing, especially jet dyeing, of fibre substrates. Because of its higher specific weight, the silicone oil is separated and forms specks on the substrate. To prevent this shortcoming, it is necessary to add the antifoam continuously, which makes the dyeing process uneconomic.

Foam inhibitors that do not have the aforementioned shortcomings have now been found.

Accordingly, the present invention relates to foam inhibitors for aqueous systems, which foam inhibitors comprise (1) 6 to 12% by weight of (A) a reaction product of a polyol, an anhydride of an aliphatic dicarboxylic acid of 2 to 10 carbon atoms and an adduct of a polyalkylene glycol and a fatty acid, or (B) a reaction product of a polyol, an anhydride of an aliphatic dicarboxylic acid of 2 to 10 carbon atoms, a higher aliphatic alcohol and a polyethylene glycol, (2) 20 to 50% by weight of a dialkyl ester of an unsaturated dicarboxylic acid, (3) 20 to 50% by weight of a mineral oil, (4) 5 to 10% by weight of a nonionic emulsifier, (5) 5 to 10% by weight of an anionic emulsifier, and (6) 0.5 to 1.5% by weight of an alkylene diamide.

As suitable component (1) (A) of the foam inhibitor according to the invention can be mentioned a propylene oxide adduct of (a) an at least trihydric aliphatic alcohol of 3 to 10 carbon atoms, (b) propylene oxide, (c) an aliphatic unsaturated dicarboxylic acid of 4 to 10 carbon atoms or the anhydride thereof, (d) a polyethylene glycol of formula HO—(CH$_2$CH$_2$O)$_n$H, wherein n is an integer from 1 to 40, and (e) a C$_{16}$–C$_{20}$ fatty acid.

A suitable component (a) is a trihydric to hexahydric alkanol of 3 to 6 carbon atoms. This alkanol may be branched or unbranched and is e.g. glycerol, pentaerythritol, sorbitol or trimethylolpropane, with pentaerythritol being preferred.

As component (b), the only suitable contender is 1,2-propylene oxide.

A particularly suitable component (c) is an ethylenically unsaturated dicarboxylic acid or the anhydride thereof, e.g. fumaric, maleic or itaconic acid, and also mesaconic, citraconic or methylenemalonic acid, or octenoic or decenoic acid. The preferred anhydride of these acids is maleic anhydride.

A particularly suitable component (d) is ethylene glycol or diethylene glycol, or polyethylene glycol having an average molecular weight of 200 to 1000, preferably of 300 to 600 and, most preferably, of 400 to 500.

Component (e) is a saturated or unsaturated acid such as palmitic acid, stearic acid, arachidic acid, palmitoleic acid, oleic acid, linoleic acid, linolenic acid, ricinolic acid or eicosenic acid, with stearic acid being preferred.

Component (1) may contain the acid groups in the free form or in salt form. The salts are obtained in known manner by addition of a base such as ammonia or an alkali metal hydroxide, e.g. sodium or potassium hydroxide, to the acid.

Component (1) (A) can be obtained as described in U.S Pat. specification No. 4,055,393. Depending on the nature of the component employed and the molar ratio, component (1) (A) can be a lower as well as a higher condensed product. A lower condensed product is obtained whenever the individual components are employed in equivalent amounts, so that preferably no polycondensation and crosslinking takes place between polyol, dicarboxylic acid and diol. A higher condensed product is obtained whenever the intermediates contain excess, still reactive hydroxyl groups, as these condense further and some may become crosslinked. Typical representatives of such lower and higher condensed products are disclosed in the above mentioned U.S. patent specification.

Propylene oxide adducts suitable as component (1) (A) are adducts of (a) pentaerythritol, (b) propylene oxide, (c) maleic anhydride, (d) polyethylene glycol having an average molecular weight of 300 to 600, and (e) stearic acid or oleic acid.

A suitable component (1) (B) of the foam inhibitor of this invention is an adduct of propylene oxide with components (a), (b), (c), (d) and (f) a C$_{12}$–C$_{18}$ fatty alcohol.

The fatty alcohol (f) may be lauryl, myristyl, cetyl and, preferably, stearyl or oleyl alcohol.

Of particular interest as component (1) (B) are those adducts that contain recurring units of the formula

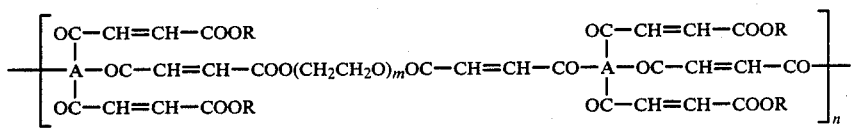

wherein R is lauryl, myristyl, cetyl, stearyl or oleyl, m is an integer from 4 to 40, preferably from 4 to 34, n is an integer from 2 to 6 and A is the

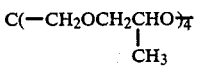

radical.

Preferred propylene oxide adducts for use as component (1) (B) are adducts of (a) pentaerythritol, (b) propylene oxide, (c) maleic anhydride, (d) polyethylene glycol having an average molecular weight of 180 to 1600, preferably of 200 to 1500, and (f) stearyl alcohol or oleyl alcohol.

A suitable component (2) is a dialkyl ester of an ethylenically unsaturated dicarboxylic acid containing 2 to 12 carbon atoms in each alkyl moiety. The dialkyl ester is obtained in known manner by reacting a dicarboxylic acid such as maleic acid or fumaric acid, or the anhydride thereof, with a $C_2$-$C_{12}$alkanol such as ethanol, propanol, isopropanol, butanol or an isomer thereof, amyl alcohol or an isomer thereof, 1-hexanol, 1-octanol, capryl alcohol, 2-ethyl-1-hexanol, 2-butanol, trimethylhexanol, n-decyl alcohol and lauryl alcohol. The reaction product of maleic acid or the anhydride thereof with 2-ethyl-1-hexanol is preferred.

A commercially available mixture of hydrocarbons may be used as component (3), e.g. paraffin oil or a mixture of 45 to 70% by weight of paraffins, 25 to 45% by weight of naphthenes and 5 to 10% by weight of aromatics. Such mixtures generally have a flash point above 100° C., a pour-point of $-3°$ to $-60°$ C., and an aniline point of 70° to 110° C. Examples of such commercially available mixtures of hydrocarbons are the mineral oils ESSO 301 ®, ESSO 302 ®, ESSO 303 ®, ESSO 304 ®, ESSO 310 ®, ESSO 311 ®, ESSO 312 ®, ESSO 320 ®and Shell Oil L 6189 ®.

A suitable component (4) is an adduct of alkylene oxide with an alcohol or alkylphenol. e.g. an adduct of alkylene oxide with an aliphatic $C_4$-$C_{22}$ alcohol, which adduct is obtained by addition of up to 80 moles of ethylene oxide and/or propylene oxide. The alcohol may preferably contain 4 to 18 carbon atoms and be saturated, branched or straight chain. It may be used singly or in admixture with other alcohols. A branched chain alcohol is preferred.

The alcohol may be a natural alcohol, e.g. myristyl alcohol, cetyl alcohol, stearyl alcohol, oleyl alcohol, arachidyl alcohol or behenyl alcohol, or a synthetic alcohol, e.g. preferably butanol, 2-ethyl-1-hexanol, amyl alcohol, 1-hexanol, and also triethyl hexanol, trimethylnonyl alcohol, or an alfol (registered trademark of the Continental Oil Company). Alfols are linear primary alcohols. The number after the name indicates the average number of carbon atoms contained by the alcohol. For example, alfol (12–18) is a mixture of decyl, dodecyl, tetradecyl, hexadecyl and octadecyl alcohol. Further examples are alfol (810), (1014), (12), (16), (18), (2022).

Preferred ethylene oxide/alcohol adducts may be illustrated by the formula $$R_3O(CH_2CH_2O)_sH \qquad (1)$$

wherein $R_3$ is a saturated or unsaturated aliphatic hydrocarbon radical, preferably an alkyl or alkenyl radical, each of 8 to 18 carbon atoms, and s is an integer from 1 to 80, preferably from 1 to 30.

Suitable for use as component (4) is an adduct of ethylene oxide and/or 1,2-propylene oxide and an alkylphenol containing 4 to 12 carbon atoms in the alkyl moiety, which phenol may contain one or more alkyl substituents. Preferably this compound has the formula

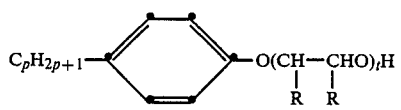

wherein R is hydrogen or not more than one of the two substituents R is methyl, p is an integer from 4 to 12, preferably 8 or 9, and t is an integer from 1 to 60, preferably from 1 to 20 and, most preferably, from 1 to 6.

If desired, this adduct of ethylene oxide/1,2-propylene oxide with an alcohol or alkylphenol may additionally contain small amounts of block polymers of the cited alkylene oxides.

Further adducts suitable for use as component (4) are polyoxyethylene derivatives of the fatty acid esters of sorbitan ethers with 4 moles of polyethylene glycol, e.g. the laurate, palmitate, stearate, tristearate, oleate and trioleate of the above ethers, e.g. the Tween products of the Atlas Chemicals Division. The tristearate of sorbitan ether with 4 moles of the polyethylene glycol of the formula $$H(CH_2CH_2)_{65}OH$$

is preferred.

Suitably, component (5) is an esterified adduct of alkylene oxide e.g. an adduct of alkylene oxide, preferably of ethylene oxide and/or propylene oxide, with an organic hydroxyl, carboxyl, amino and/or amido compound containing aliphatic hydrocarbon radicals having a total of not less than 8 carbon atoms, or a mixture of such compounds, which adduct contains acid ester groups of an inorganic or organic acid. This acid ester may be in the form of the free acid or salt, e.g. the alkali metal salt, alkaline earth metal salt, ammonium salt or amine salt.

This anionic surfactant is obtained by known methods, by addition of at least 1 mole, preferably of more than 1 mole, e.g. 2 to 60 moles, of ethylene oxide or propylene oxide, or alternately, in any order, ethylene oxide and propylene oxide, to the above organic compound, and subsequently esterifying the adduct, and, if desired, converting the ester into a salt thereof. Suitable starting materials are e.g. higher fatty alcohols, i.e. alkanols or alkenols, each containing 8 to 22 carbon atoms, alicyclic alcohols, phenylphenols, alkylphenols containing one or more alkyl substituents which together contain at least 10 carbon atoms or fatty acids containing 8 to 22 carbon atoms.

Particularly suitable anionic surfactants have the formula

wherein $R_1$ is an aliphatic hydrocarbon radical containing 8 to 22 carbon atoms or a cycloaliphatic, aromatic or aliphatic-aromatic hydrocarbon radical containing 10 to 22 carbon atoms, $R_2$ is hydrogen or methyl, A is

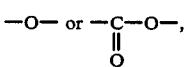

X is the acid radical of an inorganic oxgen-containing acid, the acid radical of a polybasic carboxylic acid or a carboxyalkyl radical, and n is an integer from 1 to 50.

The radical $R_1$-A in the compounds of formula (3) is derived e.g. from higher alcohols such as decyl, lauryl, tridecyl, myristyl, cetyl, stearyl, oleyl, arachidyl or behenyl alcohol; and from alicyclic alcohols such as hydroabietyl alcohol; from fatty acids such as caprylic, capric, lauric, myristic, palmitic, stearic, arachinic, behenic, $C_8$-$C_{18}$coconut fatty, decenoic, dodecenoic, tetradecenoic, hexadecenoic, oleic, linoleic, linolenic, eicosenoic, docosenoic or clupanodonic acid; from alkylphenols such as butylphenol, hexylphenol, n-octylphenol, n-nonylphenol, p-tert-octylphenol, p-tertnonylphenol, decylphenol, dodecylphenol, tetradecylphenol or hexadecylphenol; or from arylphenols such as the o- or p-phenylphenols. Preferred radicals are those containing 10 to 18 carbon atoms, especially those which are derived from the alkylphenols.

The acid radical X is normally the acid radical of a polybasic, in particular low molecular, mono- or dicarboxylic acid, e.g. of maleic acid, malonic acid, succinic acid or sulfosuccinic acid, or it is a carboxyalkyl radical, in particular a carboxymethyl radical (derived in particular from chloroacetic acid), and is attached to the radical $R_1$—A—$(CH_2CHR_2O)_n$— through an ether or ester bridge. In particular, however, X is derived from an inorganic polybasic acid such as orthophosphoric acid and sulfuric acid. The acid radical X is preferably in salt form, i.e. for example in the form of an alkali metal salt, alkaline earth metal salt, ammonium or amine salt. Examples of such salts are sodium, calcium, ammonium, trimethylamine, ethanolamine, diethanolamine or triethanolamine salts. The alkylene oxide units —$CH_2CHR_2O$— of formula (3) are normally ethylene oxide and 1,2-propylene oxide units. These last mentioned units are preferably in admixture with ethylene oxide units in the compounds of the formula (3).

Particularly interesting anionic compounds are those of the formula $$RO-CH_2CH_2O_nX \quad (4)$$

wherein $R_3$ is a saturated or unsaturated aliphatic hydrocarbon radical containing 8 to 22 carbon atoms, o-phenylphenyl or alkylphenol containing 4 to 12 carbon atoms in the alkyl moiety, and X and n have the given meanings.

Especially preferred compounds which are derived from alkylphenol/ethylene oxide adducts are also those of the formula

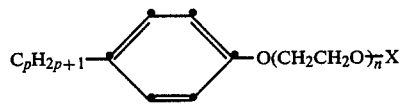

(5)

and

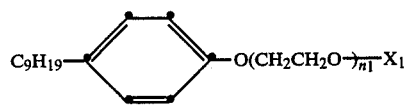

(6)

wherein p is an integer from 4 to 12, n is an integer from 1 to 20, $n_1$ is an integer from 1 to 10, $X_1$ is a phosphoric acid radical which can be in salt form, and X has the given meanings.

Component (6) is an alkylenediamide of formula

wherein $R_3$ is a $C_{14}$-$C_{22}$alkanoyl radical and $R_4$ is a $C_2$-$C_6$alkylene radical.

An alkanoyl radical $R_3$ may be the myristoyl, palmitoyl, arachinoyl, behenoyl or preferably stearoyl radical, or also a mixture thereof.

$R_4$ is preferably the ethylene radical.

Preferred foam inhibitors contain 7.0 –9.0% by weight of component (1),
35.0 –38.0% by weight of component (2),
35.0 –38.0% by weight of component (3),
7.0 –9.0% by weight of component (4),
7.0 –9.0% by weight of component (5), and
0.5 –1.5% by weight of component (6).

The foam inhibitors of this invention may also contain 0 to 3% by weight of aluminium monostearate, aluminium distearate or aluminium tristearate, calcium distearate, magnesium distearate or glycerol monostearate, with aluminium distearate being preferred.

The foam inhibitors of this invention can be prepared by mixing components (1), (2) and (6) and, optionally, the aluminium stearate, with stirring at room temperature, heating the mixture with constant stirring to the temperature range from 50° to 150° C., preferably from 90° to 120° C., for 10 to 60 minutes until all is dissolved, adding the hot solution dropwise to a charge consisting of components (3), (4) and (5), with stirring, and then cooling the mixture, with stirring, to room temperature, affording opalescent, slightly viscous, brownish, storage stable liquids.

The foam inhibitors of the invention can be used in acid or alkaline formulations (pH range from about 1 to 12) and in a wide temperature range, e.g. from 20° to 150° C., without losing their effectiveness. For use in actual practice, they can be added to the aqueous systems, undiluted or after dilution with organic solvents or water, in amounts of about 0.01 to 10 g/l pro kg, preferably 0.01 to 5 g/l pro kg.

If desired, the foam inhibitors of this invention can also be employed as dilute aqueous or organic formulations (solutions), e.g. in the form of 1 to 99% aqueous solutions or solutions in an organic solvent, e.g. 2-ethyl-1-hexanol or toluene, or a mixture of solvents. These dilute formulations make it easier to control the rate of addition to e.g. printing pastes or dyebaths.

The foam inhibitors of the present invention can be employed in a wide range of processes utilising aqueous or water-containing systems that readily tend to foam, e.g.:

(a) dyeing wool with 1:1 or 1:2 metal complex dyes, acid or reactive dyes; exhaust or continuous dyeing processes for dyeing synthetic polyamide fibres with acid or disperse dyes; dyeing polyester fibres with disperse dyes; dyeing cellulose fibres with reactive and direct dyes; dyeing polyacrylonitrile fibres with cationic dyes;

(b) finishing processes for textiles: shrinkproofing of wool and wool-containing blends, providing cellulosic fibre material with a flame-retardant and crease-resistant finish, providing different fibre substrates with an oil-, water- and dirt-repellent finish, providing different fibre substrates with an antistatic finish and a soft handle, whitening different fibre substrates;

(c) paper manufacture (pulp suspensions) or paper finishing, especially sizing paper with aqueous resin formulations or surface-coating paper (paper coating compositions).

When the formulations of this invention are used in textile dyeing and finishing processes, a good foam inhibition is obtained, even if other readily foaming assistants (surfactants) are concurrently used.

In the following Examples parts and percentages are by weight.

PREPARATORY EXAMPLES

EXAMPLE A

COMPONENT (1)

A 1.5 liter sulfating flask, fitted with stirrer, thermometer and reflux condenser, is charged with 126.5 g of the condensate of 1 mole of pentaerythritol and 4 - 5 moles of propylene oxide (mol. wt. 450), 125.2 g of maleic acid, 0.6 g of 2,6-di-tert-butyl-4-methylphenol. With stirring, the mixture is heated to 90° C. and kept at this temperature for 90 minutes. Then 843 g of polyethylene glycol 400 monostearate and 3 g of concentrated sulfuric acid are added and the reflux condenser is replaced by a distillation head. The mixture is heated to 130° C. and kept for 5 hours at this temperature under a water jet vacuum, under which conditions about 20 ml of water are distilled off. The condensate is cooled to 60° C., mixed with 8 g of sodium hydroxide (30% solution), stirred for 10 minutes and filtered warm, affording 1025 g of a brownish yellow product that congeals to a wax-like consistency upon cooling to room temperature.

Similar products which may be used as component (1) are obtained by replacing (a) the condensate of 1 mole of pentaerythritol with 4–5 moles of propylene oxide by a condensate of either 1 mole of glycerol and 5 moles of propylene oxide or 1 mole of sorbitol and 8 moles of propylene oxide, (b) maleic acid by fumaric acid or maleic anhydride, and (c) polyethylene 400 monostearate by polyethylene glycol 1000 or 750 monostearate, and in other respects carrying out the procedure described in this Example.

EXAMPLE B

COMPONENT (2)

A sulfating flask fitted with distillation head, stirrer and thermometer is charged with 49 g of maleic anhydride, 140 g of 2-ethyl-1-hexanol, 2 g of sodium bisulfate and 0.2 g of 4-hydroxyanisole. With stirring and under nitrogen, the mixture is heated to 150° C. while distilling off water and excess 2-ethyl-1-hexanol for 4 hours. The reaction mixture is then kept at 150° C. for 30 minutes under a water jet vacuum and, after subsequent cooling to room temperature, precipitated sodium bisulfate is removed by filtration. The ester is obtained in the form of a clear, yellowish liquid in a yield of 179 g.

Similar esters suitable for use as component (2) are obtained by replacing maleic anhydride by maleic acid and 2-ethyl-1-hexanol by trimethyl hexanol and in other respects carrying out the procedure of this Example.

EXAMPLE C

COMPONENT (6)

A reaction flask fitted with stirrer, drip funnel, thermometer and gas inlet pipe is charged with 1098 g of stearic acid, which are then fused. Under nitrogen, the contents of the flask are heated to 150° C. and then 130 g of ethylenediamine are added dropwise over 30 minutes while distilling off water. The reaction mixture is heated to 174° C. until no further distillate is separated, then cooled to 145° C., poured onto a metal plate, allowed to congeal and then ground. A pale beige powder with a melting point of 141°-142° C. is obtained.

A similar product which may be used as component (6) is obtained by using a technical mixture of stearic acid and palmitic acid instead of stearic acid and in other respects carrying out the procedure of this Example. Similar products are also obtained by reacting behenic acid with trimethylenediamine or hexamethylenediamine in the molar ratio 2:1.

EXAMPLE 1

In a glass beaker, 5 g of component (6) prepared in accordance with Example C, 7.5 g of aluminium distearate, 40 g of component (1) prepared in accordance with Example A and 185 g of component (2) prepared in accordance with Example B are heated, with constant stirring, to 110° C. and stirring is continued until component (6) is completely dissolved. The hot solution is added, with constant stirring, to a mixture of 185 g of mineral oil (e.g. Shell Oil L 6189 ®), 37.5 g of a nonionic emulsifier (e.g. nonylphenol decaglycol ether phosphate) and the batch is allowed to cool. An opalescent, slightly viscous brownish dispersion is obtained.

Similar dispersions are obtained by repeating the above procedure and using, as mineral oil, e.g. the oils available under the registered trademarks Esso-Oil 302 ® and Esso-Oil 320 ®, as anionic emulsifier e.g. the reaction product of 1 mole of soybean oil with 36 moles of ethylene oxide or of 1 mole of a mixture of cetyl alcohol and lauryl alcohol with 18 moles of ethylene oxide, or of 1 mole of p-nonylphenol with 35 moles of ethylene oxide, and, as nonionic emulsifier, the phosphated polyadduct of 35 moles or 100 moles of ethylene oxide with 1 mole of nonylphenol, or the sulfamic acid ester of the adduct of 1 mole of nonylphenol with 2 moles of ethylene oxide.

EXAMPLE 2

On a short-liquor jet dyeing machine, 100 kg of cotton tricot are wetted in 600 liters of deionised water of 40° C. To the bath are then added 36 kg of sodium chloride, 5 kg of the dye of formula

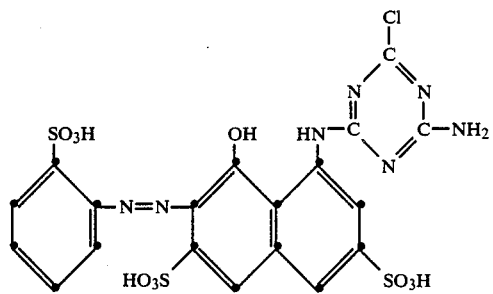

and 0.5 kg of the emulsion of Example 1. The material is dyed on the short-liquor jet for 45 minutes at 40° C. Then 0.6 kg of calcined sodium carbonate is added, followed by the addition after a further 5 minutes of 1.2 kg of a 36% aqueous solution of sodium hydroxide. The tricot is subsequently dyed for a further 40 minutes, then rinsed and given a washing off. The tricot is dyed in a fast, level red shade. No hindrance to the passage of the goods occurs during the dyeing procedure. No foam formation is observed. Dyeing in the same bath, but without addition of the emulsion of Example 1, results in strong foaming and hindrance to the passage of the goods.

EXAMPLE 3

In a muff dyeing machine, 100 kg of polyethylene terephthalate yarn are put into 1200 liters of water and the bath is heated to 60° C. The following ingredients are then added to the bath:
2400 g of ammonium sulfate
2000 g of a 70% aqueous solution of the ammonium salt of the sulfated polyadduct of a condensate of glycerol and propylene oxide having a molecular weight of 4200,
450 g of the dispersion of Example 1,
3700 g of a dye of formula 54 g of a dye of formula

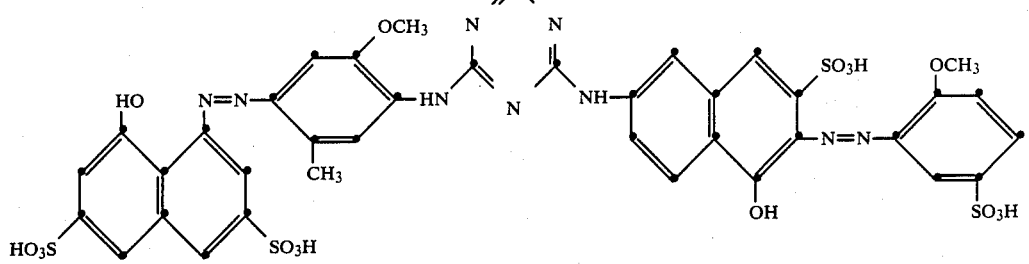

27 g of a dye formula 130 g of a dye of formula 10 g of a dye of formula

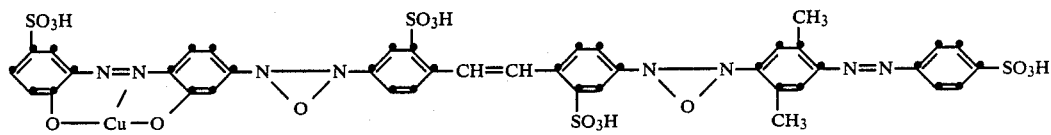

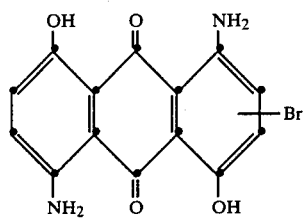

The pH of the dyebath is adjusted to 5 with 85% formic acid and the bath is heated to 130° C. over 45 minutes, after which the yarn is dyed for 60 minutes at this temperature. The bath is then cooled and the dyed yarn is rinsed and dried. The yarn is dyed in a strong, level blue shade which is fast to rubbing. The addition of the emulsion of Example 1 completely deaerates the dyebath, the overflow vessel and the muffs. Without this addition, air is entrained in the muffs and the points of intersection of the yarn are less well dyed.

EXAMPLE 4

100 kg of a cotton/polyethylene glycol terephthalate fabric (50:50) are treated for 20 minutes at 40° C. on a HT winchbeck with 3000 parts of an aqueous liquor containing 3000 g of mixture comprising
 16.5% of phenylbenzoate,
 38.5% of 2-methylphenyl benzoate,
 8% of ethylene glycol,
 17% of isopropanol,
 2% of ethanolamine,
 1.5% of pine oil, and
 16.5% of the phosphated polyaduct of 1 mole of p-nonylphenol and 10 moles of ethylene oxide,
6000 g of ammonium sulfate, and
700 g of the dispersion of Example 1.

The pH of the bath is 5.6. To the bath are then added 10 kg of sodium sulfate. The bath is heated for 40 minutes to 115° C. and the fabric is dyed for 30 minutes at this temperature. The bath is then cooled and the dyed fabric is rinsed and dried.

The addition of the emulsion of Example 1 ensures foam-free dyeing. The fabric has no tendency to swim in the winchbeck, whereby it is possible to obtain a very level dyeing.

EXAMPLE 5

In a circulation dyeing machine, a package of 70 g of cotton is wetted at 30° C. in 500 ml of water. The following ingredients are then added to the bath:

10.0 ml of a 36% aqueous solution of sodium hydroxide, 3.0 g of an 86% solution of sodium bisulfite, 0.3 g of the dispersion of Example 1, and 0.5 g of a vat dye consisting of a mixture of Vat Blue 4 C.I. 69800 and Vat Blue C.I. 69825 (1:3), which mixture has been predispersed in water and 5 ml of a 30% aqueous solution of sodium hydroxide.

After the ingredients have been homogenised, the dyebath is heated to 60° C. over 30 minutes and the cotton is dyed for 30 minutes at this temperature. Then 6 g of sodium chloride are added to the dyebath and the cotton is dyed for a further 30 minutes at 60° C. The fabric is then rinsed warm and cold and dried. The cotton is dyed in a level, fast blue shade. No troublesome foaming occurs during dyeing. However, foaming does occur if the same procedure is repeated without addition of the emulsion of Example 1.

EXAMPLE 6

In a hank dyeing apparatus, 100 kg of wool tow yarn are dyed as follows in 3000 liters of water:

The bath is warmed to 40° C., followed by the addition of 2000 g of ammonium sulfate, 2000 g of 80% aqueous acetic acid, 1500 g of a mixture of 1 part of an adduct of 1 mole of fatty acid amine (mixture of technical amines of 18 to 22 carbon atoms) and 30 moles of ethylene oxide, which adduct has been quaternised with dimethyl sulfate, and 2 parts of the sulfamic acid ester of the adduct of 1 mole of tallow amine and 14 moles of ethylene oxide.

500 g of the dispersion of Example 1.

The material carrier is introduced into the dyeing machine. The direction of the liquor is changed every 30 minutes. The solution of the dye is then added, namely 2000 g of the 1:2 mixed chromium complex of each of the dyes of formula

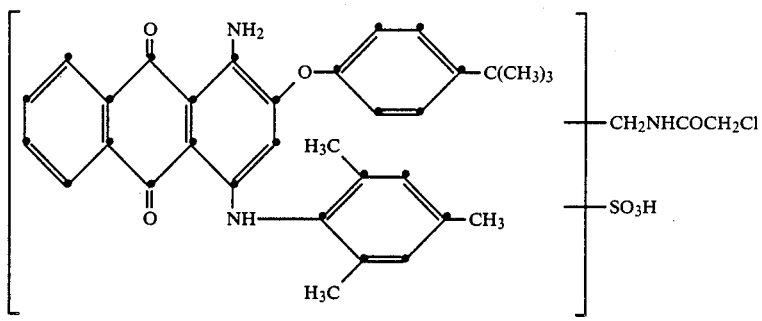

and 2000 g of the dye of formula

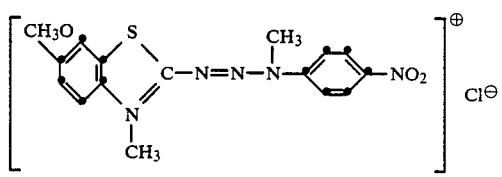

The dyebath is then heated to 100° C. over 40 minutes and this temperature is kept for 30 minutes. The bath is then cooled and the fabric is rinsed, wrung out and dried. A level dyeing is obtained. The deaerating and defoaming action of the emulsion of Example 1 keeps the dyeing system completely free from foam.

EXAMPLE 7

In a single-tier hank dyeing machine, 100 kg of polyacrylonitrile high-bulk yarn are first shrunk in 2000 liters of water at 90° C., then cooled to 60° C. The following components are then added to the bath: 1.5 g of the dye of the formula

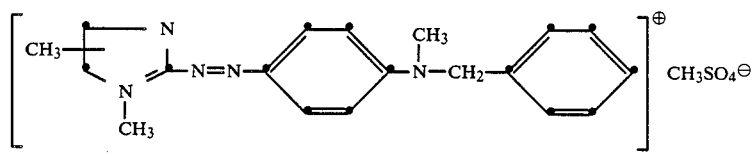

0.13 kg of the dye of the formula

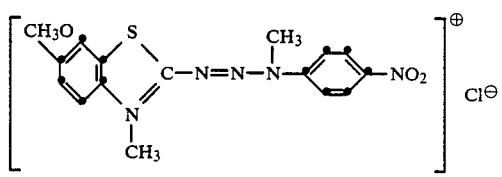

0.5 kg of the dye of the formula

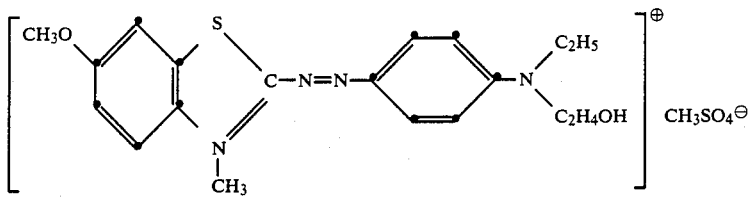

2 kg of 80% acetic acid, 10 kg of anhydrous sodium sulfate and 0.6 kg of the dispersion of Example 1. After all the components have been homogenised, the bath is heated to boiling temperature in the course of 45 minutes and dyeing is carried out for 60 minutes at this temperature. The bath is subsequently cooled and the goods are rinsed, wrung out and dried. The yarn is dyed in a level and fast shade. Dyeing without addition of the emulsion of Example 1 results in flecked dyeings caused by channel formation and entrained air.

What is claimed is:

1. A foam inhibitor for aqueous systems, which comprises
   (1) 6 to 12% by weight of (A) a reaction product of a polyol, an anhydride of an aliphatic dicarboxylic acid of 2 to 10 carbon atoms and an adduct of a polyalkylene glycol and a fatty acid, or (B) a reaction product of a polyol, an anhydride of an aliphatic dicarboxylic acid of 2 to 10 carbon atoms, a higher aliphatic alcohol and a polyethylene glycol,
   (2) 20 to 50% by weight of a dialkyl ester of an unsaturated dicarboxylic acid,
   (3) 20 to 50% by weight of a mineral oil,
   (4) 5 to 10% by weight of a nonionic emulsifier,
   (5) 5 to 10% by weight of an anionic emulsifier, and
   (6) 0.5 to 1.5% by weight of an alkylene diamide.

2. A foam inhibitor according to claim 1, wherein component (1) is a propylene oxide adduct of
   (a) an at least trihydric aliphatic alcohol of 3 to 10 carbon atoms,
   (b) propylene oxide,
   (c) an aliphatic unsaturated dicarboxylic acid of 4 to 10 carbon atoms or the anhydride thereof,
   (d) a polyethylene glycol of formula HO—(CH$_2$CH$_2$O)$_n$H, wherein n is an integer from 1 to 40, and
   (e) a C$_{16}$–C$_{20}$ fatty acid.

3. A foam inhibitor according to claim 2, wherein component (a) is selected from glycerol, pentaerythritol, sorbitol or trimethylolpropane.

4. A foam inhibitor according to claim 2, wherein component (c) is the anhydride of an ethylenically unsaturated dicarboxylic acid of 4 to 10 carbon atoms.

5. A foam inhibitor according to claim 4, wherein component (c) is maleic anhydride.

6. A foam inhibitor according to claim 5, wherein component (d) is a polyethylene glycol of formula HO—(CH$_2$CH$_2$O)$_n$H, wherein n is 4 to 34.

7. A foam inhibitor according to claim 6, wherein component (e) is stearic acid.

8. A foam inhibitor according to claim 7, wherein component (a) is pentaerythritol.

9. A foam inhibitor according to claim 1, wherein component (2) is a dialkyl ester of an ethylenically unsaturated dicarboxylic acid containing 2 to 12 carbon atoms in each alkyl moiety.

10. A foam inhibitor according to any one of claims 1 to 9, wherein component (2) is a dialkyl ester of maleic acid that contains 8 or 9 carbon atoms in each alkyl moiety.

11. A foam inhibitor according to any one of claims 1 to 9, wherein component (1) is an adduct of propylene oxide with pentaerythritol, propylene oxide, maleic anhydride, polyethylene glycol having an average molecular weight of 300 to 600, and stearic acid.

12. A foam inhibitor according to claim 11, wherein component (2) is di(2-ethyl-n-hexyl) maleate.

13. A foam inhibitor according to claim 12, wherein component (5) is a polyoxyethylene derivative of a fatty acid ester of a sorbitan ether.

14. A foam inhibitor according to claim 12, wherein component (4) is nonylphenol decaglycol ether phosphate.

15. A foam inhibitor according to claim 14, wherein component (6) is the reaction product of ethylenediamine and stearic acid.

16. A foam inhibitor according to any one of claims 1 to 15, which contains
   7.0–9.0% by weight of component (1),
   35.0–38.0% by weight of component (2),
   35.0–38.0% by weight of component (3),
   7.0–9.0% by weight of component (4),
   7.0–9.0% by weight of component (5), and
   0.5–1.5% by weight of component (6).

17. A foam inhibitor according to claim 1, wherein component (1) is a propylene oxide adduct of
   (a) an at least trihydric aliphatic alcohol of 3 to 10 carbon atoms,
   (b) propylene oxide,
   (c) an aliphatic unsaturated dicarboxylic acid of 4 to 10 carbon atoms or the anhydride thereof,
   (d) a polyethylene glycol of formula HO—(CH$_2$CH$_2$O)$_n$H, wherein n is an integer from 1 to 40, and
   (f) a C$_{12}$–C$_{18}$ fatty alcohol.

18. A foam inhibitor according to claim 17, wherein component (f) is stearyl alcohol or oleyl alcohol.

19. A foam inhibitor formulation which is diluted with water or an organic solvent and which contains 1 to 99% of a foam inhibitor as claimed in any one of claims 1 to 18 and 99 to 1% of water or of an organic solvent.

20. A process for defoaming aqueous systems, which comprises adding to said aqueous system a foam inhibitor as claimed in any one of claims 1 to 18 or of a formulation as claimed in claim 19.

* * * * *